Patented Jan. 10, 1928.

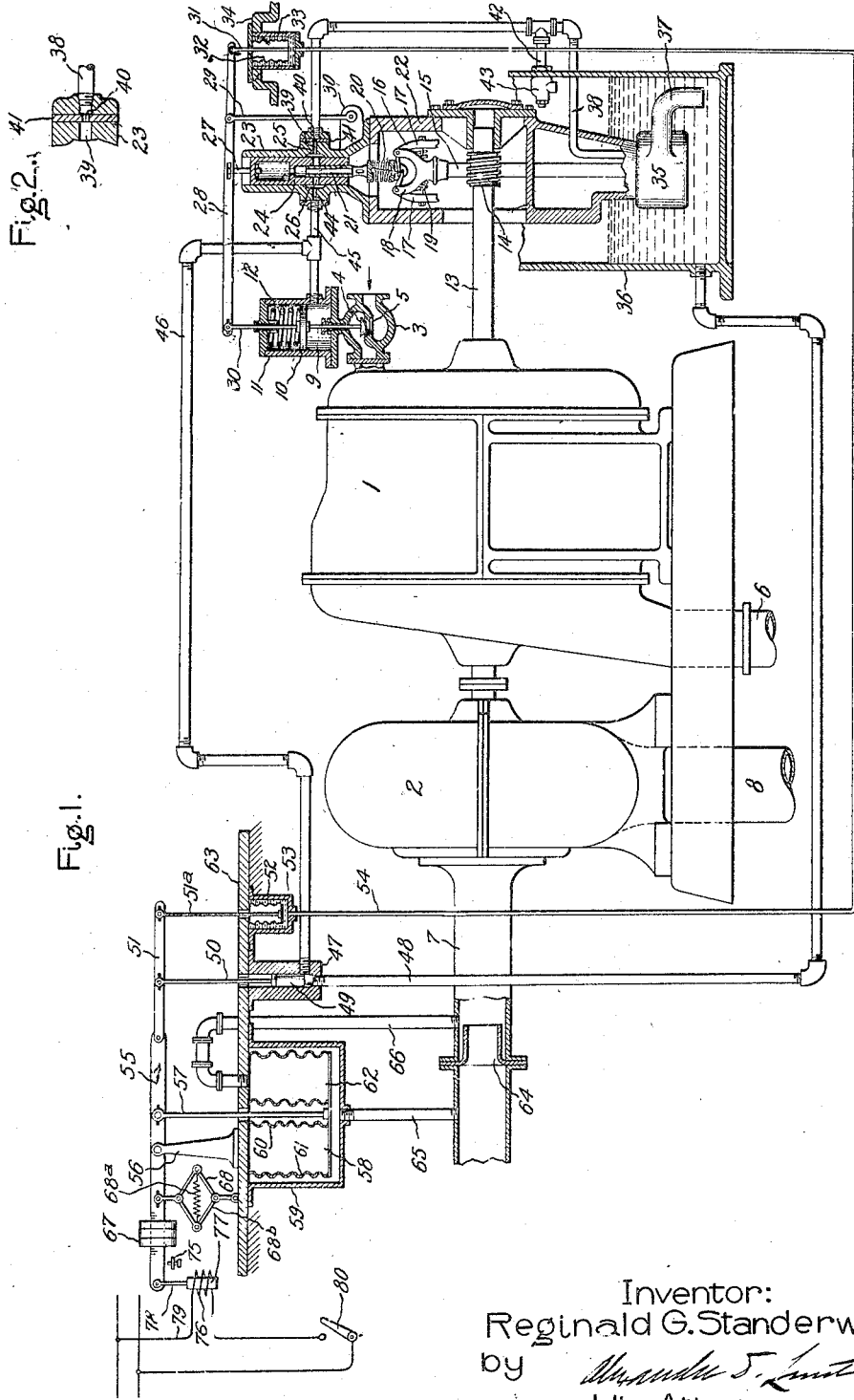

1,655,683

UNITED STATES PATENT OFFICE.

REGINALD G. STANDERWICK, OF MARBLEHEAD, MASSACHUSETTS, ASSIGNOR TO GENERAL ELECTRIC COMPANY, A CORPORATION OF NEW YORK.

REGULATING MECHANISM FOR TURBINE-DRIVEN CENTRIFUGAL COMPRESSORS.

Application filed April 23, 1926. Serial No. 104,236.

The present invention relates to turbine driven centrifugal compressors and has for its object to provide an improved construction and arrangement for regulating a machine of this type in accordance with an operating condition of the compressor, for example, in accordance with the suction in the inlet conduit of the compressor, in accordance with the pressure in the discharge conduit of the compressor, or in accordance with the volume of the substance passing through the compressor, whereby such operating condition is maintained at a desired value.

For a consideration of what I believe to be novel and my invention, attention is directed to the accompanying description and the claims appended thereto.

In the drawing, Fig. 1 is a diagrammatic view of a turbine-driven centrifugal compressor provided with a regulating mechanism embodying my invention, the regulating mechanism illustrated being one which serves to maintain a constant volume of flow through the compressor, (such a mechanism being termed usually a constant volume governor), and Fig. 2 is a detail sectional view.

Referring to the drawing, 1 indicates an elastic fluid turbine which drives a centrifugal compressor 2. The flow of elastic fluid to turbine 1 is regulated by a valve mechanism 3, the same being shown diagrammatically and by way of example as a simple valve member 4, which is moved relatively to the valve seat 5. The exhaust conduit for the turbine is indicated at 6. 7 indicates the inlet conduit for the compressor and 8 the discharge conduit. The stem 9 of valve member 4 is connected to a piston 10 which moves in a cylinder 11. Between the top of the cylinder 11 and piston 10 is a spring 12 which serves to bias valve 4 toward closed position. On an extension 13 of the turbine shaft is a worm 14 which drives a vertical shaft 15, there being a suitable worm wheel (not shown) on shaft 15. Connected to the upper end of shaft 15 is a centrifugal speed governor 16 comprising weight arms 17 pivoted on a yoke 18 and suitably connected by a spring 19 which opposes outward movement of the weight arms.

The weight arms are connected by a suitable yielding connection 20 to a tubular pilot valve 21. Pilot valve 21 rotates with the speed governor and is moved down and up by it when weight arms 17 move out and in. Speed governor 16 is located in a suitable housing 22 on the upper end of which is mounted a pilot valve casing 23. Inside pilot valve casing 23 is a restoring bushing 24 in which pilot valve 21 rotates and moves vertically. Between the outer surface of restoring bushing 24 and the inner surface of pilot valve casing 23 is an annular chamber 25 which is connected to the interior of bushing 24 by a series of circumferentially spaced ports 26. The upper end of restoring bushing 24 is connected by a link 27 to a lever 28, which lever is fulcrumed on a vertical rod 29 supported on a bracket 30 which projects from pilot valve casing 23. The left hand end of lever 28 is connected by a spindle 30 to piston 10. The right hand end of lever 28 is connected by a rod 31 to the head of a corrugated bellows 32 arranged in a fluid-tight casing 33. The casing 33 is supported on a suitable rigid bracket or support 34. The interior of the corrugated bellows 32 is open to atmosphere while the exterior is subjected to the pressure in casing 33. Bellows 32 forms an abutment adapted to be moved when pressure is applied to it and is to be taken as typical of any suitable device of this type.

The lower end of vertical shaft 15 drives an oil pump 35 located in an oil tank 36. 37 indicates the suction inlet of the pump and 38 the discharge conduit. Discharge conduit 38 is connected to a port 39 in pilot valve casing 23, the connection being through a small orifice 40 in a plate 41. Connected to pipe 38 is a branch pipe 42 which leads back to tank 36. On the end of pipe 42 is a pressure relief valve 43, the function of which is to maintain in discharge pipe 38 a predetermined desired pressure. Annular chamber 25 is connected by a passage 44 and a pipe 45 to cylinder 11 at a point below piston 10. Connected to pipe 45 is a branch pipe or by-pass pipe 46 which at its other end is connected to a pilot valve casing 47. Leading from pilot valve casing 47 is a discharge pipe 48 which extends back to oil tank 36. In pilot valve casing 47 is a pilot valve 49 adapted to cover and uncover the end of pipe 46 thereby regulating the flow of oil through pipe 46. Stem 50 of pilot valve 49 is connected to a lever 51 at a point intermediate between its ends. The right hand end of lever 51 is connected by a rod 51ª to a corrugated bellows 52 located in a fluid-tight casing 53. The interior of bellows 52 is open to atmosphere while the exterior is subjected to the pressure in casing 53. Casing 53 is connected to casing 33 by a pipe 54. The left hand end of lever 51 is pivotally connected to one end of a lever 55 fulcrumed on a bracket 56. Lever 55 is connected by a rod 57 to a corrugated bellows structure 58 located in a fluid-tight casing 59. Corrugated bellows structure 58 comprises an inner bellows 60 and an outer bellows 61 which, at their lower ends, are connected to a head 62 and at their upper ends are connected to the under side of a platform 63, which platform serves also as a supporting means for pilot valve casing 47, bellows 52 and casing 53 and bracket 56. Corrugated bellows structure 58 provides an elastic device of the nature of a coiled spring, as is well understood, the same having a neutral position and requiring a certain force to either collapse or distend it.

Arranged in inlet conduit 7 is a pressure-difference-creating device 64 of any suitable type which functions to create a pressure difference which bears a definite relation to the rate of flow through the conduit. The leading or high pressure side of pressure-difference-creating device 64 is connected by a pipe 65 to casing 59 and the trailing or low pressure side of pressure-difference-creating device 64 is connected by a pipe 66 to the annular chamber between bellows 60 and 61. The interior of bellows 60 is open to atmosphere. With the foregoing arrangement the bellows structure 58 is subjected to the differential pressure created by the device 64 which serves to effect contraction and expansion of the bellows structure 58 in accordance with changes in the rate of flow through conduit 7. In connection with the bellows structure, it is pointed out that in actual practice the bellows 60 is so small in diameter as compared to bellows 61 that the area of the portion of head 62 which lies within bellows 60 may be disregarded so that it may be considered that the differential pressures created by the pressure-difference-creating device act on equal areas of head 62.

On the left hand end of lever 55 are suitable adjustable weights 67 for balancing the lever. Also connected to the left hand end of lever 55 is a device 68, the function of which is to modify the characteristic of the differential bellows 58. The device 68 is indicated only diagrammatically in the drawing. It is fully illustrated and described in my application Serial No. 104,235, filed of even date herewith. Briefly, it comprises what I term an inverted elastic connection, spring 68ª of the device acting on pivoted levers 68ᵇ in a manner such that the device assists in the movement of the bellows structure 58. By the use of this device, the characteristic of the bellows structure may be modified so that it may be moved a unit of distance by any desired pressure value.

75 indicates an adjustable stop to limit downward movement of the left hand end of lever 55. At 76 is indicated a solenoid, the core 77 of which is connected by a spindle 78 to lever 55. Connected with solenoid 76 is an electrical circuit 79 in which is arranged a suitable switch 80. When switch 80 is closed the solenoid functions to draw the left hand end of lever 55 down against stop 75.

Casing 33, outside of bellows 32, pipe 54, and casing 53, outside bellows 52, are filled with a suitable liquid whereby there is provided an hydraulic means for transmitting motion from one bellows to the other.

The operation is as follows:—

Assume that valve 4 is open to a predetermined extent and is supplying sufficient elastic fluid to turbine 1 to drive compressor 2 at a speed such that it is delivering the desired volume of air. Under these circumstances, the speed being below a predetermined high value, governor 16 holds pilot valve 21 in a position such that it covers completely the ports 26. This is what may be termed the inoperative position of speed governor 16, it being set so that it does not come into action until the speed exceeds a predetermined desired value. Pump 35 operates to deliver oil to pipe 38 and by reason of the relief valve 43 there is maintained in pipe 38 a predetermined pressure. From pipe 38 oil is applied to pressure pipe 39 through orifice 40, and since the pressure in pipe 38 is substantially constant, the quantity of oil which flows through orifice 40 is substantially constant. The oil from passage 39 flows around annular chamber 25 to passage 44 from whence it is discharged to pipe 45. From pipe 45 the oil flows to cylinder 11 beneath piston 10 and also through pipe 46 to pilot valve casing 47, and thence through pipe 48 back to oil tank 36.

The mechanism comprising lever 51, positions pilot valve 49 in a certain position relatively to the end of pipe 46 whereby an amount of oil flows through pipe 46 such that there is maintained in the pipe and under piston 10 a pressure which will keep piston 10 in a position to hold valve 4 open far enough to supply the required amount of elastic fluid to the turbine. The bellows structure 58 is subjected to the differential pressure created by pressure-difference-creating device 64 and by reason of this pressure difference applied to it, it maintains a certain balanced position wherein the bellows structure is collapsed to a certain extent, the leading or higher pressure being applied to the outer surface of head 62. If now the volume of flow of fluid through conduit 7 decreases, which means that the speed of the set must be increased in order to bring it back to normal, the differential pressure created by pressure-difference-creating device 64 decreases with the result that the bellows structure 58 distends somewhat. This serves, through rod 57, to lower the right hand end of lever 55 and raise the left hand end. When right hand end of lever 55 lowers, it lowers also the left hand end of lever 51, which turns on the upper end of rod 51$^a$ as a fulcrum. This lowers pilot valve 49 in casing 47, thereby covering somewhat more the end of pipe 46. This decreases the flow of fluid from pipe 46, thereby increasing the pressure in the pipe and hence the pressure under piston 10. As a result, piston 10 is raised somewhat against the action of spring 12 to open further valve 4, thereby admitting additional elastic fluid to the turbine to increase the speed of the turbine.

When piston 10 moves upward it turns lever 28 on the upper end of rod 29 as a pivot, the right hand end of the lever being lowered. The lowering of the right hand end of lever 28 distends bellows 32, thereby forcing liquid from casing 33 through pipe 54 to casing 53. This causes the bellows 52 in casing 53 to collapse somewhat, thereby raising the right hand end of lever 51, which at this time turns on the right hand end of lever 55 as a fulcrum. This serves to lift pilot valve 47, thereby moving it back towards its original position. This movement of pilot valve 49 to again uncover somewhat the end of pipe 46 serves to arrest further opening of valve 4 and hence further increases in the speed of the turbine. In other words, this arrangement forms a follow-up connection for the pilot valve to prevent over-travel of the governing mechanism. When lever 28 moves, it raises also thereby restoring bushing 24, but owing to the fact that speed governor 16 is inactive at the turbine speeds in question, pilot valve sleeve 21 overlaps ports 26 to an extent such that the movement of bushing 24 does not uncover ports 26. The movement of bushing 24, therefore, has no effect on the governing operation.

When the volume of flow through conduit 7 increases above the volume for which the constant volume governor is set, the pressure difference created by device 64 increases with the result that bellows structure 58 is collapsed somewhat, thereby raising the right hand end of lever 55. This raises pilot valve 49 and after the manner already described effects a closing movement of valve 4, thereby lowering the turbine speed to bring the volume back to normal value.

Speed governor 16 forms a pre-emergency governor, being set so that it is normally inactive. It comes into action to take control of the turbine in case the speed of the set increases beyond a predetermined high value.

By adjusting the value of weight 67 or its position on lever 55, the volume for which the governor is set may be varied. Preferably the adjustment is effected by varying the position of the weight along the lever, the lever being provided with a suitable scale which may be calibrated in terms of volume. Also the position of device 68 relatively to lever 55 determines the extent to which it modifies the characteristic of bellows structure 58. In this connection, it will be understood that bellows structure 58 plus device 68 forms in substance a pressure responsive device actuated by changes in the pressure difference set up by the pressure-difference-creating device 64, and that while I now prefer to use this particular arrangement, my invention is not limited thereto, as any suitable type of pressure responsive device may be used.

Circuit closer 80 may be located at any point from which it is desired to control the set so as to check its speed when desired. For example, in the case of blast furnace blowing, it may be desired to slow down the speed of the set during casting. When circuit closer 80 is closed, the left hand end of lever 55 is drawn down against stop 75, thereby raising pilot valve 49 and effecting a closing movement of valve means 4 to an extent such as to bring the turbine speed down to the desired value. Stop 75 may be adjusted to limit the total movement of lever 55 to that which will effect the desired speed change.

With the above described arrangement, the platform or support 63, together with the control mechanism carried by it, may be located at any desired point adjacent to or in the vicinity of the turbine set and is connected to it only by the piping shown. As a result, the control mechanism to be mounted directly on the turbine set becomes comparatively simple in structure and comprises but few parts. This reduces the number of levers on the turbine and serves to simplify the mechanism to be mounted on the turbine. Platform 63 and the mechanism mounted thereon may be built and assembled as a unit and lends itself to being mounted on a suitable pedestal at the desired point. Also, the apparatus is simple in structure, reliable in operation, and capable of being built at low cost.

In accordance with the provisions of the patent statutes, I have described the principle of operation of my invention, together with the apparatus which I now consider to represent the best embodiment of my invention, but I desire to have it understood that the apparatus shown is only illustrative and that the invention may be carried out by other means.

What I claim as new and desire to secure by Letters Patent of the United States is:

1. The combination of a turbine driven compressor, valve means controlling the flow of elastic fluid to the turbine, a fluid-actuated motor for the valve means, a conduit for supplying fluid under pressure to said motor, a pressure responsive device, a pilot valve connected to said device controlling the pressure in said conduit, means for supplying to said pressure responsive device a pressure which bears a definite relation to an operating condition of said compressor, a second pilot valve controlling the pressure in the conduit, and a speed governor connected to said second pilot valve.

2. The combination of a turbine driven compressor, valve means controlling the flow of elastic fluid to the turbine, a fluid-actuated motor for the valve means, a conduit for supplying fluid under pressure to said motor, a pressure responsive device, a pilot valve connected to said device controlling the pressure in said conduit, means for supplying to said pressure responsive device a pressure which bears a definite relation to an operating condition of said compressor, a second pilot valve controlling the pressure in said conduit independently of the first-named pilot valve, a speed governor connected to said second pilot valve, and a follow-up mechanism actuated by movement of the valve means which acts on the first-named pilot valve to prevent overtravel of the valve means.

3. The combination with a turbine driven centrifugal compressor having valve means controlling the flow of elastic fluid to the turbine and a fluid-actuated motor for moving the valve means, of means for regulating said motor comprising a pressure responsive device, a floating lever, means connecting the pressure responsive device to said floating lever, a conduit for supplying actuating fluid to the motor, a pilot valve for controlling the pressure of the actuating fluid in said conduit, means connecting said pilot valve to said floating lever, a movable abutment connected to said floating lever, a second movable abutment connected with said valve means, means actuated by movement of said valve means to effect movement of both of said abutments, and means for supplying to said pressure responsive device a pressure which bears a definite relation to an operating condition of said compressor.

4. The combination with a turbine driven centrifugal compressor having valve means controlling the flow of elastic fluid to the turbine and a fluid-actuated motor for moving the valve means, of a constant volume governor for said turbine comprising a lever, a pressure responsive device connected to the lever, means responsive to flow through said compressor connected to said pressure responsive device, a conduit for supplying actuating fluid to the motor, a pilot valve connected to said lever which controls the pressure of the actuating fluid in said conduit, a speed governor, and a pilot valve connected to said governor for controlling the pressure of the actuating fluid in the supply conduit.

5. The combination with a turbine, a compressor driven by it, valve means controlling the flow of elastic fluid to the turbine, and a fluid-actuated motor for said valve means, of a constant volume governing means therefor comprising a movable device, means for moving it in response to the volume of flow in the compressor, a lever connected to said movable device, a weight on said lever, the position of the weight on the lever being variable, a conduit for supplying fluid pressure to said motor, a pilot valve connected with said lever which controls the fluid pressure in said conduit, and means for transmitting movement from said valve means to said pilot valve.

In witness whereof, I have hereunto set my hand this 21st day of April, 1926.

REGINALD G. STANDERWICK.